March 19, 1929.   J. POLEK   1,705,646
ARC WELDING GENERATOR

Filed June 13, 1927

INVENTOR
JOSEPH POLEK
BY
A. D. T. Libby
ATTORNEY

Patented Mar. 19, 1929.

1,705,646

UNITED STATES PATENT OFFICE.

JOSEPH POLEK, OF BROOKLYN, NEW YORK.

ARC WELDING GENERATOR.

Application filed June 13, 1927. Serial No. 198,394.

This invention relates to an arc welding system, which includes a generator for delivering the welding current, that is especially constructed so as to have inherent regulation, whereby the generator will have substantially a constant output at different speeds within reasonable limits. The generator to be described and claimed herein is especially adapted for use in a combination where the prime mover or driving source of energy is an internal combustion engine, which has a speed varying through wide limits, depending upon the position of the throttle.

When an internal combustion engine is used, as the prime mover, I have worked out an arrangement by which, when the welding operation is not going on, for example when a new electrode is being fitted to the electrode holder, the throttle is automatically closed and the speed reduced, thereby saving fuel, but under such conditions the generator is designed to deliver a voltage considerably above the welding potential required, so that even with the reduced speed of the generator, an arc may be readily struck.

I have also provided an arrangement or control for the engine, such that when the arc is struck, the engine throttle is automatically opened and the speed of the generator is increased, thereby placing it in condition to carry the maximum load. This arrangement also provides quickly adjustable means, whereby the output of the generator can be set to any desired value, depending on the class of welding work to be done.

Figure 1:
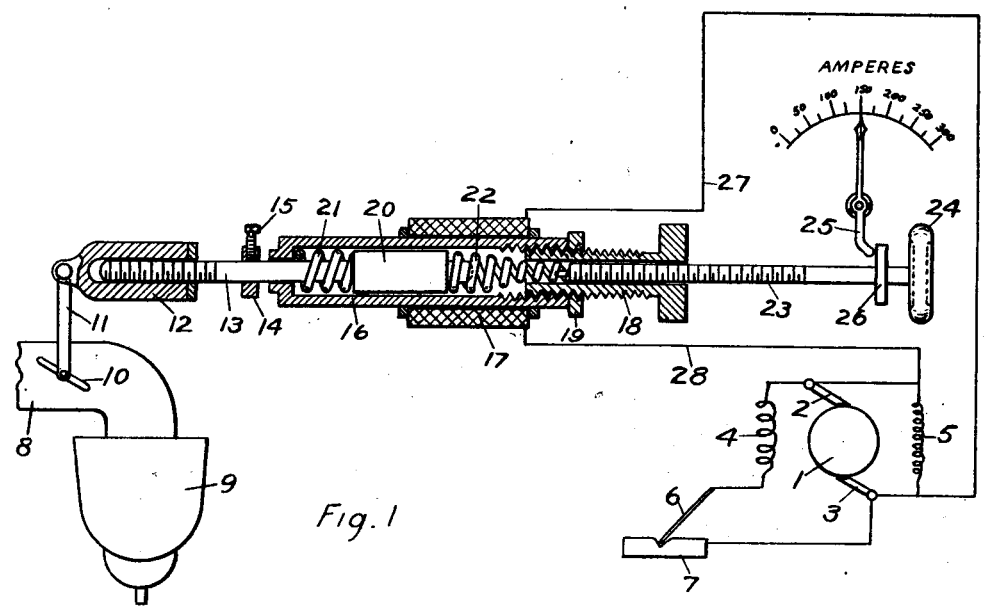
Figure 2:
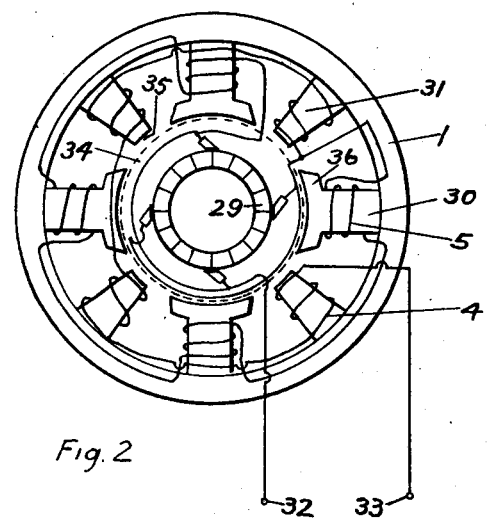

From what has been said, the objects of my invention will be readily understood and appreciated, particularly after a reading of the specification taken in connection with the annexed drawing, in which Figure 1 is a diagrammatic arrangement showing the engine control mechanism and the generator connected into an arc welding circuit. Figure 2 is a diagram illustrating the construction of the generator.

In the drawing, the generator 1, comprises a field ring and an armature having brushes 2 and 3 of opposite polarity, as shown in Figure 1, it being understood that in practice, I may use, for example, four sets of brushes, such as shown in Figure 2, or there may be a plurality of brushes arranged in parallel. The generator has two sets of field pole pieces 30 and 31, the poles of each set being substantially the same, but the two sets being materially different in their construction. The pole pieces 31 carry a series winding 4, while the pole pieces 30 carry a shunt winding 5, the terminals of the generator 32 and 33, are adapted to be connected to the welding electrodes 6 and 7 in a manner similar to that shown in Figure 1. It will be noted by reference to Figure 2 that the periphery of the armature is designated by dotted line 34, and that the pole pieces 31 are tapering in form toward the armature, while the pole pieces 30 have extended pole tips 36. The air gap between the poles 30 and their respective tips 36, and the armature is considerably less than the air gap 35, between the pole pieces 31 and the armature. The purpose of this construction will be later referred to.

8 is a fragment portion of the intake manifold of an internal combustion engine. To the manifold 8 is connected the usual carburetor 9, and a throttle 10 is provided for controlling the speed of the engine. Connected to the throttle 10 is a lever 11, and a nipple 12, which is threaded to receive a threaded end of the rod 13. Within the barrel 16 is carried a plunger 20 attached to the end of the rod 13. Solenoid 17 is carried by the barrel 16 and is adapted to be connected in shunt across the brushes 16, by the wires 27 and 28 and around the rod 13 is a spring 21, while in the other end of the barrel 16 is a spring 22, preferably somewhat heavier than the spring 21. One end of the barrel 16 is threaded to receive an adjusting screw 18, on which is carried a lock nut 19. The screw 18 is internally threaded and carries a threaded adjusting member 23, having a knob 24 for screwing the member 23 forward and back in the carrier screw 18. Associated with the member 23 is a collar 26 adapted to be engaged by the end 25, of an indicating lever, the opposite end of which cooperates with the graduating scale to indicate the output of the generator.

Carried on the rod 13 is an adjusting collar 14 and a set screw 15, which limits the amount of movement of the throttle 10. It will be understood that a pair of lock nuts or the equivalent may be used instead of the collar 14 and the screw 15. By the adjustment of the collar 14 and the parts 18 and 23, the control of the engine throttle can be regulated within very close limits and when the welding operation ceases the voltage of the generator increases, allowing the solenoid to pull the plunger 20 inward to close the throttle, but when the arc is struck by the electrode 6 on the work 7, the voltage of the generator is lowered and the spring 22 overcomes the effect of the solenoid 17, thereby opening the throttle, speeding up the engine and the generator, so that the generator will deliver the necessary current according to the value desired, and indicated by the scale associated with the control mechanism.

As the load on the generator increases due to the welding operations the tapered end of the poles 31 toward the armature becomes saturated and this together with the larger air gap at this point prevents any further building up of the magnetic flux in these poles; it being a well known fact that a plain shunt field generator under load has a drooping characteristic; and it will be understood in the present case that due to the larger air gap under the poles 31, through which the flux from the shunt wound poles 30 travels, that a point is reached whereby the flux will build up no further and no greater load than that for which the system is set, can be taken from the generator, it being understood that the poles 30 and 31 act cumulatively and not differentially.

The arrangement of the generator pole pieces and disposition of the windings thereon is such as to give substantially constant output for any given setting, and at the same time, the construction is such that the output has a maximum limit so that the generator or the prime mover cannot be unduly overloaded and thereby injured.

While I have shown no field rheostat in circuit with the shunt field 5 one of course, may be used if desired.

It will be apparent that my invention is susceptible of certain changes without departing from the spirit of the same.

Having thus described my invention, what I claim is:

1. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces, alternately arranged, a shunt winding on one set of pole pieces, a series winding on the other set of pole pieces, one set of pole pieces having a greater air gap with respect to the armature, than the other set of pole pieces.

2. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, the set of pole pieces carrying the series winding having a greater air gap with respect to the armature than the other set of pole pieces.

3. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, one set of pole pieces having extended pole tips which are closer to the armature than the other set of pole pieces.

4. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, the set of pole pieces carrying the shunt winding having extended pole tips which are closer to the armature than the pole pieces carrying the series winding.

5. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, one set of pole pieces being tapered from the field ring toward the armature and having a greater air gap with respect to the armature than the pole pieces of the other set of pole pieces.

6. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, the set of pole pieces carrying the series winding being tapered from the field ring toward the armature and having a greater air gap with respect to the armature than the other set of pole pieces, which carry the shunt winding.

7. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, one set of pole pieces having extended pole tips and the other set being tapered from the field ring toward the armature.

8. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, one set of pole pieces having extended pole tips, the shunt winding being arranged on this set of pole pieces the other set of pole pieces being tapered from the field ring toward the armature and carrying the series winding.

9. For an arc welding system, a prime mover having a throttle, a generator driven by said prime mover and having only a single winding on its armature which is driven at variable speeds and delivering current at variable voltages, an adjustable device separate from the generator but having a part connected to said throttle and having a part responsive to the voltage of the generator for predetermining the output of the generator as desired according to the welding work to be done, and means constituting inherent parts of the generator for delivering the predetermined output, said means comprising two sets of pole pieces alternately arranged, a shunt winding on one set of pole pieces, a series winding on the other set of pole pieces, one set of pole pieces having extended pole tips, the shunt winding being arranged on this set of pole pieces the other set of pole pieces being tapered from the field ring toward the armature and carrying the series winding, said last mentioned pole pieces having a greater air gap with respect to the armature than the pole pieces carrying the shunt winding.

10. For an arc welding system, a prime mover having a throttle, a generator driven at a variable speed by said prime mover, a device including an energizing coil adapted to be connected across the generator brushes for setting the load which is desired to be taken from the generator, said device having a part connected to said throttle for determining the maximum speed at which the generator shall be driven, said generator having two sets of pole pieces alternately arranged, a shunt winding on one set of pole pieces, a series winding on the other set of pole pieces, one set of pole pieces having an average greater cross-sectional area than the other set as well as a shorter armature air gap, said first mentioned set of pole pieces having extended pole tips and carrying the shunt winding, the series winding being carried on the other set of pole pieces.

11. For an arc welding system, a prime mover having a throttle, a generator driven by said prime mover, a device responsive to the voltage of the generator for moving said throttle, said device being adjustable to indicate the current output of the generator, and to control the movement of the throttle, said generator having two sets of pole pieces alternately arranged, a shunt winding on one set of pole pieces, a series winding on the other set of pole pieces, one set of pole pieces having an average greater cross sectional area than the other set as well as a shorter armature air gap.

12. For an arc welding system, a prime mover having a throttle, a generator driven by said prime mover, a regulator responsive to the voltage of the generator for moving said throttle, said regulator being adjustable to indicate the current output of the generator and to control the movement of the throttle, said generator having two sets of pole pieces alternately arranged, a shunt winding on one set of pole pieces, a series winding on the other set of pole pieces, one set of pole pieces having extended pole tips, and the shunt winding being arranged on this set of pole pieces, the other set of pole pieces being tapered from the field ring toward the armature and carrying the series winding, said last mentioned pole pieces having a greater air gap with respect to the armature than the pole pieces carrying the shunt winding whereby the generator will deliver the current predetermined by the setting of the regulator.

In testimony whereof, I affix my signature.

JOSEPH POLEK.